E. G. PLUMMER.
TRANSMISSION GEARING.
APPLICATION FILED MAR. 15, 1913.
1,194,317.
Patented Aug. 8, 1916.
2 SHEETS—SHEET 2.
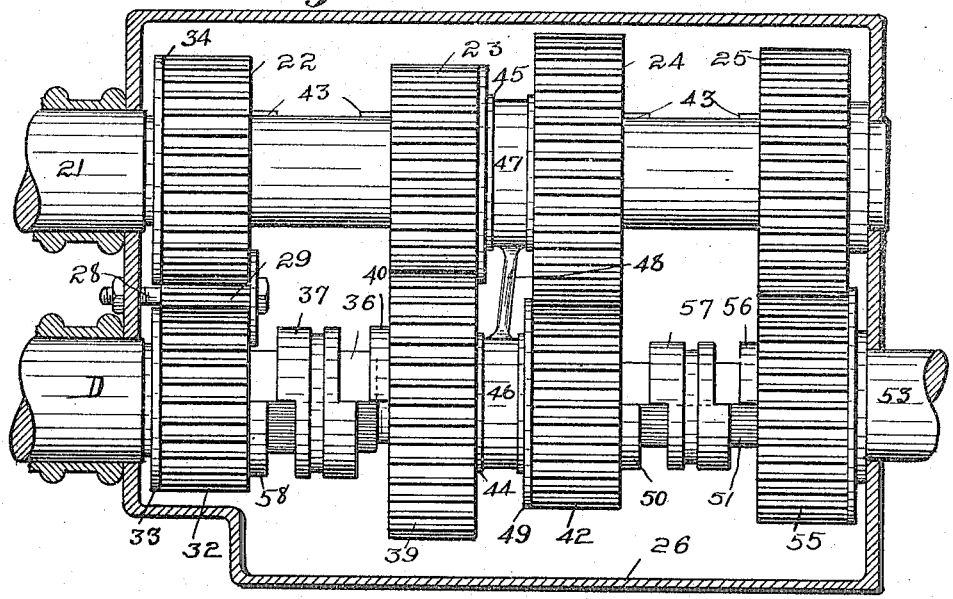
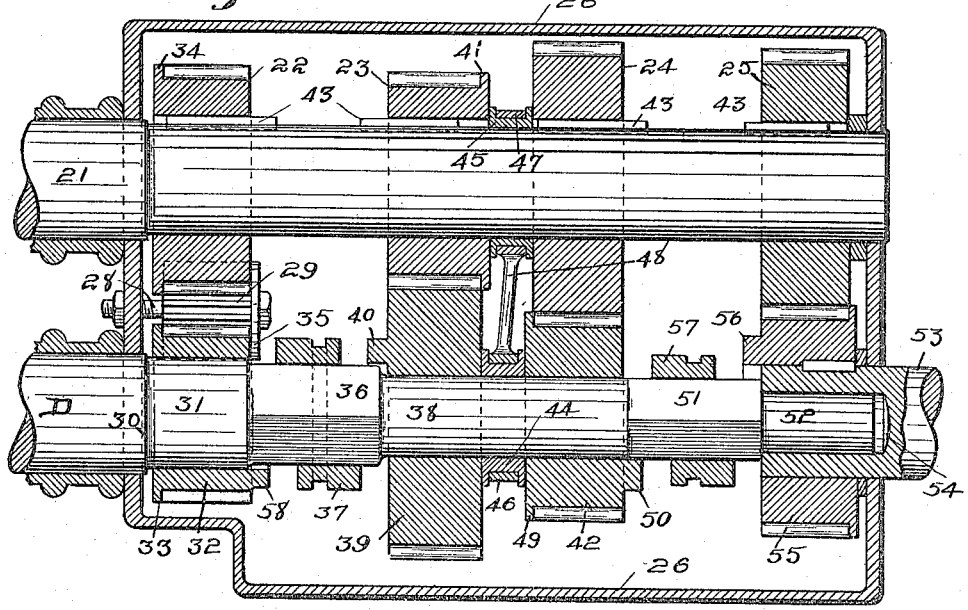

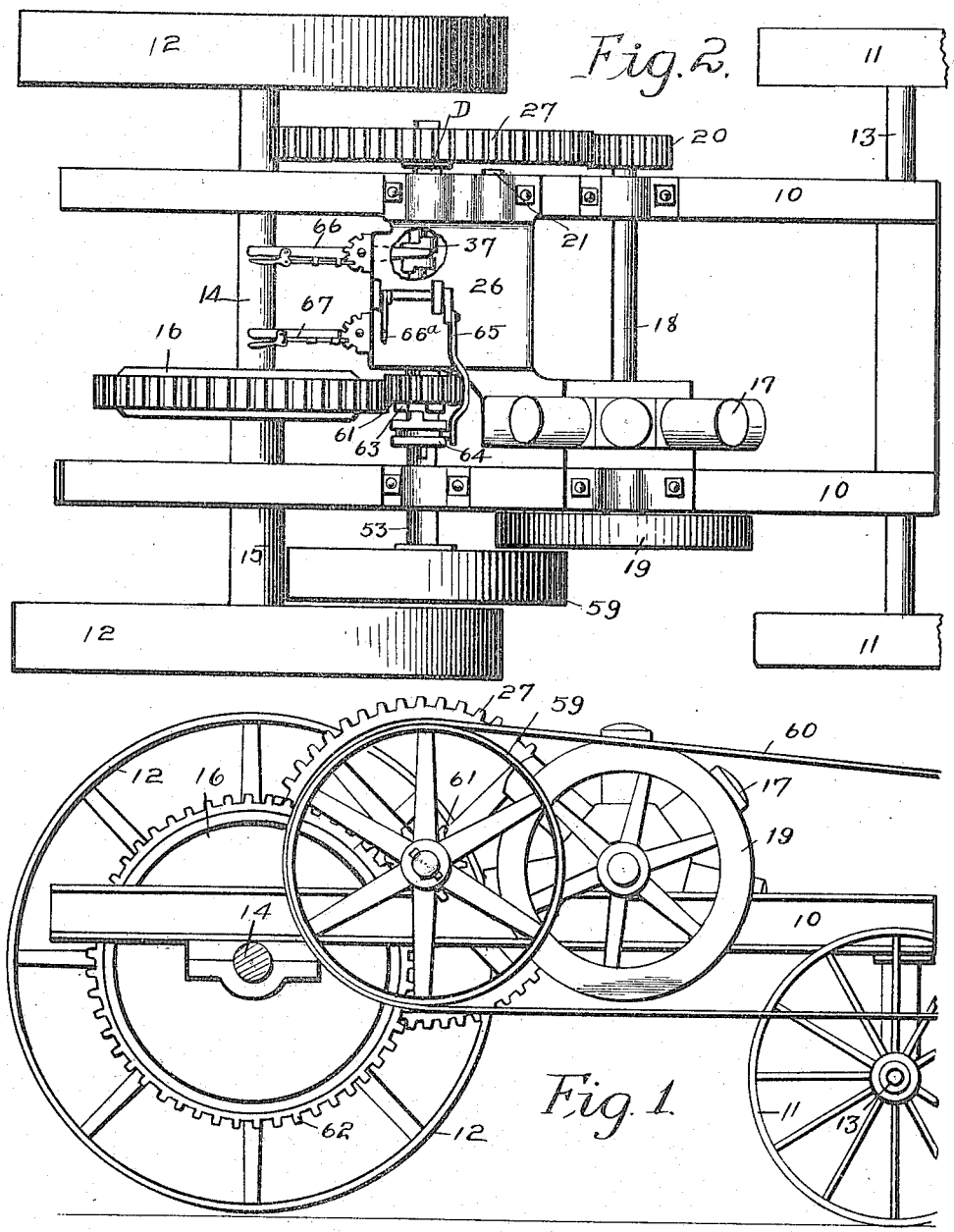

UNITED STATES PATENT OFFICE.

EZRA G. PLUMMER, OF NEWTON, IOWA.

TRANSMISSION-GEARING.

1,194,317.  Specification of Letters Patent.  Patented Aug. 8, 1916.

Application filed March 15, 1913. Serial No. 758,055.

*To all whom it may concern:*

Be it known that I, EZRA G. PLUMMER, a citizen of the United States, and resident of Newton, in the county of Jasper and State of Iowa, have invented a certain new and useful Transmission-Gearing, of which the following is a specification.

The object of my invention is to provide a transmission gearing of simple construction especially designed for traction engines.

A further object is to provide such a transmission gearing in which the fly wheel is directly connected with the engine shaft, the belt wheel for the transmission of power is arranged on a separate shaft and the transmission gearing is arranged between said belt wheel and the engine shaft so that power may be transmitted from the engine to other machinery at the rate of speed varying from that of the engine shaft.

A further object is to provide in such a gearing device a pair of shafts and gear wheels of the selective gear transmission type in which one of the shafts and the gears are so constructed and arranged that all of the gears and clutches may be assembled upon the shafts from one end so that each gear and clutch member may be made in a solid piece.

My invention consists in certain details, in the construction, combination and arrangement of the various parts of the device whereby the objects contemplated are attained, as hereinafter more fully set forth, pointed out in my claim and illustrated in the accompanying drawings, in which, Figure 1 shows a side elevation, partly in section, of a portion of a traction engine equipped with a transmission gear embodying my invention. Fig. 2 shows a top or plan view of the same with part of the gear casing cut away. Fig. 3 shows a detail, plan view of the transmission gear proper and Fig. 4 shows a horizontal, sectional view through the transmission gear proper.

In the accompanying drawings I have used the reference numeral 10 to indicate generally the frame members of a traction engine which is mounted upon front wheels 11 and rear wheels 12. The front wheels are connected by the axle 13 and the rear wheels by the axle 14, the sleeve 15 and the differential gear 16. Mounted upon the frame 10 is an engine 17, preferably of the multiple cylinder type, which operates the engine shaft 18. Connected directly with the engine shaft 18 is a fly wheel 19. On the engine shaft 18 is a gear 20. Suitably mounted on the frame of the machine is a driven shaft indicated generally by the reference character D. Suitably mounted on the frame is the countershaft 21 arranged in a position parallel with the driven shaft D. Non-rotatably mounted upon the shaft 21 are four gears indicated by the reference numerals 22, 23, 24 and 25. The said gears are secured to the shaft 21 non-slidably and non-rotatably by means of keys 43. The transmission gearing member is included within a suitable gear casing 26. On the shaft D is a gear 27, shown in Figs. 1 and 2, in mesh with the gear 20 on the engine shaft.

Mounted on the frame and on the casing 26 is an idler shaft 28 on which is a gear 29 in mesh with the gear 22. The shaft D is provided near one end with a shoulder 30 and the portion 31 of the shaft D adjacent to the shoulder 30 on one side thereof is cylindrical in form but smaller in diameter than the main portion of said shaft. Rotatably mounted upon the portion 31 of the shaft D is a gear 32 having on its side adjacent to the shoulder 30 a circumferential annular flange 33. On the corresponding side of the pinion 22 is a similar flange 34. The pinion 29 engages both the pinions 31 and 22 and the end of the pinion 29 engages the flanges 33 and 34 thereby holding the pinions 32, and 22 at the limit of their movement in one direction. On one end of the pinion 29 is a circumferential annular flange 35 designed to engage the ends of the pinions 22 and 32 opposite the flanges 33 and 34 for holding the last two named pinions against movement in the opposite direction. The portion 36 of the shaft D, adjacent to the portion 31 thereof is angular and is preferably slightly smaller in its greatest diameter than the portion 31. Slidably but non-rotatably mounted on the portion 36 is a clutch member 37. Adjacent to the portion 36 is a portion 38 of the shaft D which is cylindrical in form and smaller in diameter than the portion 36 so that the end of the portion 36 forms a shoulder adjacent to the portion 38. Rotatably mounted on the portion 38 is a gear 39 in mesh with the gear 23. Formed on the gear 39 is a clutch member 40 designed to coact with the sliding clutch member 37. The portion 36 prevents sliding movement of the gear 39 in one direction and said pinion is held against sliding movement in the other direction by means of a circumferential annular flange 41 formed at one end of the gear 23 and designed to engage the side of the pinion 39, as shown in Fig. 4. Rotatably mounted on the portion 38 of the shaft D is a gear 42 in mesh with the gear 24 and spaced apart from the pinion 39 by means of a spacing sleeve 44. Mounted on the shaft 21 between the gears 23 and 24 is a similar spacing sleeve 45. Mounted on the sleeves 44 and 45 and arranged to permit free rotation thereof are collars 46 and 47 which are connected by a brace 48. On the side of the pinion gear 42, adjacent to the sleeve 44 is formed a circumferential annular flange 49 designed to engage the side of the gear 24 and to prevent sliding movement of the pinion 42 away from the sleeve 44. Formed on the side of the pinion 42 opposite the sleeve 44 is a clutch member 50. The portion 51 of the shaft D adjacent to the portion 38 thereof is preferably angular in form and preferably has its greatest diameter slightly shorter than the diameter of the portion 38. Adjacent to the portion 51 is a cylindrical portion 52 of the shaft D. Rotatably mounted on the frame of the machine and extending into the casing 26 is a shaft 53 having in its end an opening 54 in which the cylindrical portion 52 is rotatably mounted. Keyed on the shaft 53 and within the casing 26 is a gear 55 in mesh with the gear 25. Formed on the gear 55 is a clutch member 56. Slidably mounted on the portion 51 of the shaft D is a double clutch member 57 designed in different positions of its movement to coact with the clutch members 50 and 56 respectively.

The various gears herein described are of such relative sizes that when the gear 55 and the shaft 53 are operated directly from the shaft D there is produced what is commonly known as "high" speed of the shaft 53. The shafts are operated at "high" speed when the clutch 57 is thrown into operative relation with the clutch member 56. When the clutch member 57 is moved into operative relation with the clutch member 50 the gear 55 and the shaft 53 are operated through the shaft D, the gear 42, the gear 24, the shaft 21 and the gear 25, producing what is commonly known as "low" speed. When the clutch member 37, which is also a double clutch member, is thrown into operative relation with the clutch member 40 "intermediate" speed is produced. When the clutch member 37 is thrown into operative relation with the clutch member 58 formed on the gear 32, the direction of rotation of the shaft 53 is reversed.

In the practical assembling of the transmission gearing within the casing 26, one end of the shaft 21 is inserted through the gear casing and the gears are placed on said shaft and keyed in position. One end of the shaft D is then inserted into the casing and the gears and clutch members are placed in position on the shaft.

It may be noted that all of the gears and clutch members may be placed on the shaft D from one end thereof and that on account of the peculiar construction of the shaft D the clutch members may all be made solid instead of in two pieces, as in many clutches. This construction of the shaft I consider one of the important advantages of my transmission gearing, enabling me to produce a very strong and suitable clutch arrangement. On the shaft 53, outside the gear casing 26 I have mounted a belt pulley 59, shown in Figs. 1 and 2, which carries the belt 60. Rotatably but non slidably mounted on the shaft 53, outside the gear casing 26, is a gear 61 which is in mesh with the middle gear 62 of the differential gearing 16. Formed on the gear 61 is a clutch member 63. Slidably but non rotatably mounted on the shaft 53 is a clutch member 64 designed to coact with the clutch member 63 on the gear 61. I provide suitable mechanism 65 controlled by a lever 66 for controlling the clutch member 64. The clutch members 37 and 57 are controlled by means of levers 66 and 67, shown in Fig. 2.

I claim as my invention:

In a device of the class described, a support, a shaft rotatably mounted thereon having a relative large portion at one end, a comparatively smaller cylindrical portion adjacent thereto, an angular portion adjacent to said cylindrical portion somewhat smaller in its greater diameter than said cylindrical portion, a second cylindrical portion adjacent to said angular portion smaller in diameter than the shortest diameter of said angular portion, a section angular portion shorter in diameter than said second cylindrical portion, and a third cylindrical portion having a shorter diameter than said second angular portion, said shaft being so formed that gears may be placed thereon from one end and located on said cylindrical portions, and one-piece clutch members may be placed on the shaft from one end and located on the angular portions, gears loosely mounted on said cylindrical portions having clutch members, double clutch members slidably but nonrotatably mounted on said angular portions, a counter shaft, gears fixed thereon, two of said gears being in mesh with two of the gears on the first shaft, an idler shaft in mesh with one of the gears on the first shaft and one on the second shaft, a shaft mounted in said support having an opening received in one end of said first shaft, a gear fixed on said last shaft in mesh with one of the gears on said second shaft, means for operating said double clutch members, certain gears on the respective shafts being provided near one side with peripheral annular flanges adapted to engage the sides of the gears meshing with the gears having flanges, whereby the gears on the first shaft are held against sliding movement toward the smaller end of said shaft.

Des Moines, Iowa, February 12, 1913.

EZRA G. PLUMMER.

Witnesses:
M. WALLACE,
L. ROBINSON.

Copies of this patent may be obtained for five cents each, by addressing the "Commissioner of Patents, Washington, D. C."